C. W. Baldwin.
Liquid Meter.
No. 90,479.  Patented May 25, 1869.

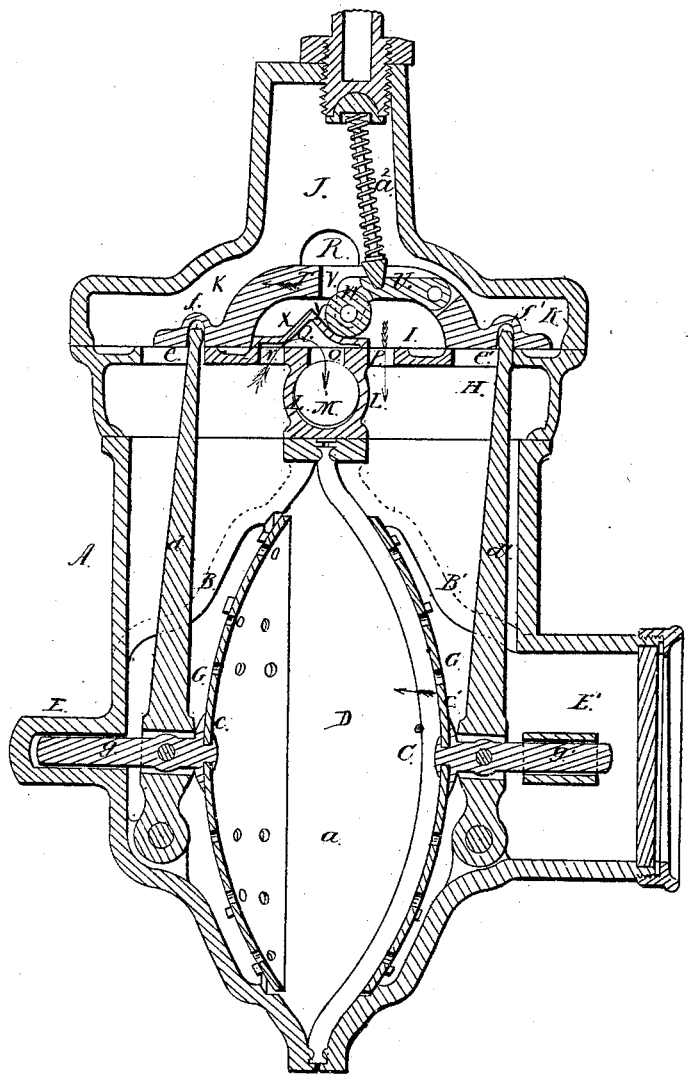

Sheet 2 - 2 Sheets.

Witnesses:
Edward Griffith
E. H. Lewins

Inventor:
C. W. Baldwin
by his Attorney
Frederick Curtis.

United States Patent Office.

CYRUS W. BALDWIN, OF BOSTON, MASSACHUSETTS.

Letters Patent No. 90,479, dated May 25, 1869.

IMPROVEMENT IN FLUID-METERS.

The Schedule referred to in these Letters Patent and making part of the same.

*To all to whom these presents shall come:*

Be it known that I, CYRUS W. BALDWIN, of Boston, in the county of Suffolk, and State of Massachusetts, have made an invention of certain new and useful Improvements in Liquid-Meters; and do hereby declare the following to be a full, clear, and exact description thereof, due reference being had to the accompanying drawings, making part of this specification, and in which—

Figure 1 is a vertical and transverse section of a liquid-meter, as embodying my invention or improvements.

Figure 3:
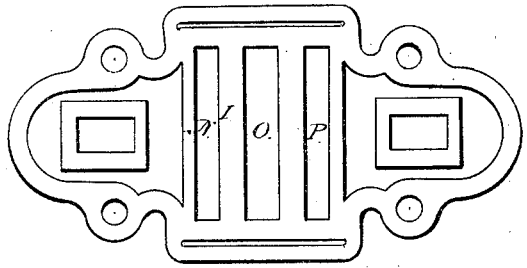
Figure 3 is a plan of the valve-seats.
Figure 2:
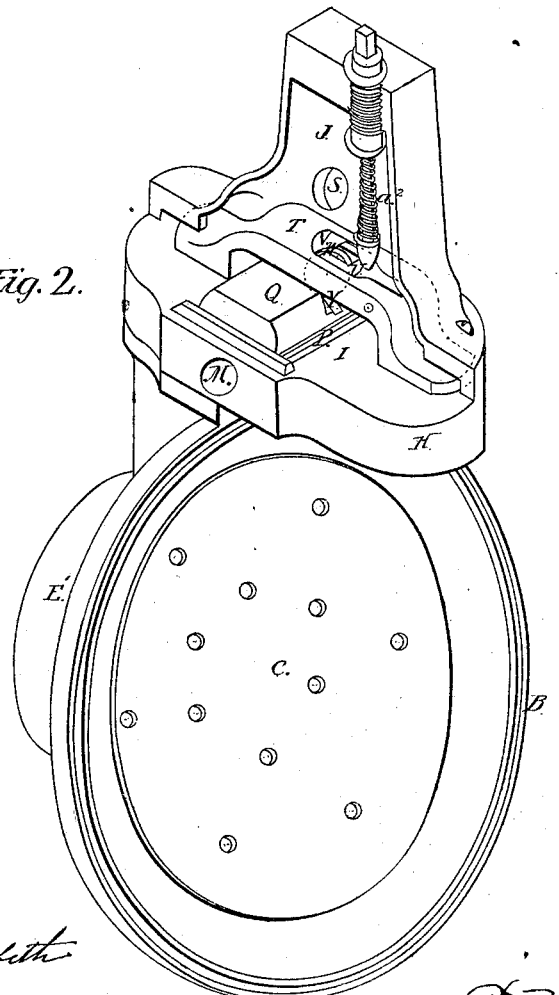
Figure 2 is a perspective representation of the valve and parts of the meter, with the actuating-device of the former.

The invention comprising the subject-matter of these Letters Patent, is an improvement in that class of liquid-meters known as "diaphragm-meters," and in which the alternate pulsations of an elastic diaphragm in a shallow, circular chamber, have the effect of not only determining and registering accurately the amount of a flowing liquid, but of effecting mechanically the operations of the valves which regulate the ingress and egress of such liquid to and from the meter.

A particular instance of the class of meters to which my present invention appertains, and to the details of whose construction such invention has local and especial reference, is exhibited and described in Letters Patent of the United States, issued to me on the 31st day of December, 1867, and numbered 72,958.

Heretofore, in the construction of diaphragm-meters, much trouble has been experienced, owing to the uncertain action of the India-rubber diaphragm, of confining, to a precise and unvarying locality, the extremes of movement of such diaphragm, and consequently, the amount of liquid flowing through the meter is liable to vary with changing conditions of pressure of such liquid.

One object I have had in view in making this invention, and which the above-mentioned faults have demonstrated to be necessary to the perfect working of a diaphragm-meter, is to provide a means of compelling a uniform and unvarying action of the elastic diaphragm under any and all changes of conditions to which the meter may be subjected.

Still another purpose of this invention is, to admit of the ingress and egress of liquid to a meter from several points, this latter being a matter of convenience in the use of a meter, and not in any sense vital to its successful operation.

The first-mentioned object is attained by disposing within the liquid-receiving or diaphragm-chamber of the instrument, in the path of movement of the diaphragm, and upon opposite sides of the same end of the chamber, two sliding concavo-convex foraminous disks, or gratings, or their equivalents, such disks being connected with the valve-operating mechanisms, and susceptible of short intermittent lateral reciprocations, imparted to them by the pulsations of the diaphragm, as hereinafter explained, such disks further operating conjointly with the walls of the diaphragm-chamber, in manner as hereinafter explained, to serve as a fixed and determined stop, or abutment, to cover a greater portion of the area of both sides of the diaphragm, and enforce an equal action of such diaphragm.

The second object, as above enumerated, is secured by an arrangement of the valve-ports with respect to a series of inlet-orifices, and a general receiving-passage, provided with a plurality of discharging-outlets, whereby the liquid may enter the meter through one or all of the former, and pass from it through one or all of the latter, as occasion or necessity may dictate, the arrangement and operation of the same being hereinafter referred to and explained.

In the drawings, before alluded to as accompanying this specification, and which illustrate my invention, a meter is shown at A, as composed of two upright and somewhat shallow, twin, concavo-convex, or concavous disks, or bowls, B B', such bowls being properly screwed or bolted together at their circumferences, and so as to enclose between them an elastic diaphragm, C, as represented, the diaphragm, by this means, in addition to its more important functions, serving to seal the joint between the disks B B', the union of such disks creating a case, G, and diaphragm-chamber, D, the latter being divided by the diaphragm into two equal parts, *a a*.

Each disk, or bowl B is formed with a lateral, central, and hollow elongation, or extension, E or E', for containing a portion of the valve-operating mechanism, to be described.

To the upper part of the case G an inverted box, H, is securely bolted, the upper surface I of such box forming the valve-seat of the meter, while this box H is in turn provided with a pyramidal or tapering hollow cup, J, securely bolted to its valve-seat, and of such size and disposition as to form a valve-chamber, K, for the valve.

The box H has a central and transverse partition, L, extending across it, as shown in fig. 1 of the accompanying drawings, while, through such partition, an open horizontal passage, or conduit, M, is formed, it being observed that there is no communication between such conduit and the diaphragm-chamber other than an indirect one by way of the valve-ports, to be explained.

The outlets of the conduits are entirely outside of the case G, and serve to conduct liquid from the meter.

The valve-ports of the instrument are three in number, and are shown at N O P, in the drawings, as made transversely through the valve-seat I, and arranged, with respect to the diaphragm chamber and to the conduit, in manner similar to the ports, cylinder, and exhaust-passage of a steam-engine.

The valve of the instrument is shown at Q as sliding upon the seat I, and arranged, with respect to the ports N O P, in manner similar to the corresponding parts of a steam-engine, with the exception that the length of the valve is curtailed to such an extent as not to entirely close both outer ports N P simultaneously.

By this means the current of the fluid is not entirely checked, and the sudden spasmodic fluxions of such liquid, as before premised, are obviated, and a steady and even flow produced.

The cap J may be constructed with a number of inlet-orifices, to admit of flow of liquid to the instrument, but, in practice, two will be found sufficient to answer all requirements.

In the accompanying drawings, these two inlet-orifices are shown at R or S as made through opposite sides and the shortest axis of the cap J, these conjoint orifices being of sufficient area to admit to the valve-chamber all the liquid of which the instrument is capable of measuring, the original pressure upon the liquid following it in its passage through and from the instrument.

An arched bar, T, straddles the valve Q, and slides upon the valve-seat I, such bar extending longitudinally of the valve-chamber, and being provided with a tilting-lever, U, disposed within a central slot, V, made in such bar T, and pivoted to it, the said lever U being provided with an anti-friction roller, W, to rest upon the top of the valve, as represented, and with a spring, $a^3$, for pressing it upon the valve-seat.

The valve Q has two twin inclined grades, X Y, cut upon its opposite sides, at an angle of about forty-five degrees to the plane of the valve-seat, such grades being for reception of the roller W, which acts upon them alternately, as hereinafter stated.

To the lower part of the interior of each semi-chamber $a$ $a$, and between the walls of such chambers and the foraminous disks $c$ $c'$, to be explained, I pivot two twin upright vibrating levers, $d$ $d'$, the upper extremities of these levers extending through orifices, $e$ $e'$, made in the valve-seat I, and into recesses, or enclosures, $f'$ $f$, formed in the under side of the valve-actuating bar T, before mentioned, it being understood that such bar extends entirely about such orifices, and closes communication between them and the valve-chamber.

To the lower part of each of the levers $d$ or $d'$, and a short distance above its fulcrum, I pivot a short horizontal rod, $g$ or $g'$, the body of such rods being supported in suitable bearings, $h$ or $h'$, making part of the lateral extremities E E' of the case G.

To the inner extremity of each rod $g$ $g'$, and immediately contiguous to the levers $d$ or $d'$, I firmly secure a concavo-convex foraminous disk, or grating, before mentioned, as shown at $c$ $c'$, the outline of such disks conforming to the general conformation of the interior of the diaphragm-chamber D.

These disks may be of such size as to entirely monopolize the interior surface of the diaphragm-chamber, or they may form a portion only of the same, the united wall of such chamber, and of the disks, serving, as before alluded to, to cover the entire surface of the diaphragm, and control its pulsations.

The above description embraces the mechanical construction of a liquid-meter, as embodying my invention, and will enable mechanics of average acquirements to construct it.

The following explanation will elucidate its operation, such explanation being premised by the statement that the diaphragm-chamber, during the working of the instrument, is at all times full of liquid, and taking as a starting-point the position of the valve as shown in fig. 1 of the accompanying drawings, which closes one port, N, and leaves the other port, P, full open, the diaphragm C being at the extreme of its movement in one direction, and disposed below the open port P.

The liquid enters and fills the valve-chamber K through either or both of the inlet-orifices R S, and the confluent streams, flowing through the open port D, impinge against the body of liquid which fills the diaphragm-chamber.

The pressure of this moving liquid upon the said body of liquid, acts upon the diaphragm, and forces it in the direction of its arrow, the liquid in advance of it being driven out of the chamber D, and into and through the port N, thence into the chamber of the valve Q, and into and through the central port O, from whence it is discharged into the general conduit M.

From either end of this conduit M the liquid may be conducted to its ultimate destination.

The diaphragm, in sympathy with the moving body of liquid, continues its movement in the direction of its arrow, and causes a corresponding movement of the lever $d'$ and the disk C', which movement of the said lever effects a movement of the sliding bar T upon its seat, in the direction of its arrow, the various parts continuing their advance until the diaphragm reaches its extreme opposite point, having, before reaching this point, brought up against the disk C, and forced it and its lever $d$ into a position corresponding to that of the disk C' and lever $d'$, as shown in the drawings, the disk serving as an abutment to the diaphragm, as before observed.

As soon as the diaphragm reaches this last-mentioned extreme point, the arched bar, or actuator T reaches its extreme point also, which brings its roller $w$ to bear upon the inclined grade X of the valve, and forces such valve, with a quick, sudden movement, upon its seat in the direction of its arrow, and consequently closes the port P, and shuts off flow of liquid to the diaphragm-chamber from this side, and opens the port N to permit flow of liquid to the opposite side of such chamber.

The liquid now begins to escape from the opposite side $a'$ of the chamber D, through the port P, and the diaphragm, to advance in a direction opposite to that first mentioned, and as shown by its arrow.

As the movements and operation of the two sides of the instrument are duplications of one another, further explanation upon this point is not considered necessary, as, from what has already been said, persons accustomed to the working of liquid-meters, and the principle of hydraulics in general, will understand perfectly the nature and working of my invention.

I would remark, that where a foraminous disk is employed upon each side of the diaphragm, as in the present instance, I have found it desirable, in several respects, to form upon the outer face of each disk a series of spurs, or points, to bear upon the inner faces, or walls of the case G.

I would also remark, that a suitable indicating-mechanism is to be connected with the bar $g'$, before mentioned, for the purpose of registering the amount of liquid flowing through the instrument.

Claims.

I claim as my invention, and desire to secure by Letters Patent of the United States, as follows:

1. In a liquid-meter, in which an elastic diaphragm is employed for the purpose specified, I claim the improved construction of such meter, whereby nearly the entire surfaces, or area of such diaphragm are covered, at each extreme of its movement, by a portion, or portions of the case of the instrument, and by a disk, or grating, the same being for the purpose of compelling a uniform action of the diaphragm, under all conditions, with resulting advantages before stated.

2. I claim, in combination with the elastic diaphragm of a liquid-meter, of the class before alluded to, the foraminous disks c c', when connected with and operating the valve or valves of such meter, and when also acting as a stop, or abutment, to determine a uniform operation of the diaphragm, for the purpose before set forth and explained.

3. I claim the levers d d', when pivoted to the case G, and combined with the diaphragm C and disks c c', to operate the valve Q, substantially in manner, and for the purpose as before explained.

4. I claim the arrangement of the inlets, and the general conduit, or passage M, in connection with the valve Q and the ports N O P, whereby a liquid-meter may possess several points of ingress and departure for liquid, substantially as before premised.

CYRUS W. BALDWIN.

Witnesses:
  EDWARD GRIFFITH,
  FRED. CURTIS.